(12) United States Patent
Nuggehalli (10) Patent No.: US 9,924,456 B2
(45) Date of Patent: Mar. 20, 2018

(54) UPLINK ROUTING FOR ENHANCED LWA

(71) Applicant: MEDIATEK INC., Hsinchu (TW)

(72) Inventor: Pavan Santhana Krishna Nuggehalli, San Carlos, CA (US)

(73) Assignee: MediaTek INC., Hsin-Chu (TW)

( * ) Notice: Subject to any disclaimer, the term of this patent is extended or adjusted under 35 U.S.C. 154(b) by 0 days.

(21) Appl. No.: 15/593,323

(22) Filed: May 12, 2017

(65) Prior Publication Data

US 2017/0332317 A1   Nov. 16, 2017

Related U.S. Application Data

(60) Provisional application No. 62/335,853, filed on May 13, 2016.

(51) Int. Cl.

| H04W 48/18 | (2009.01) |
| H04W 76/02 | (2009.01) |
| H04W 76/04 | (2009.01) |
| H04W 74/00 | (2009.01) |
| H04L 29/08 | (2006.01) |

(Continued)

(52) U.S. Cl.
CPC ......... *H04W 48/18* (2013.01); *H04W 74/004* (2013.01); *H04W 76/025* (2013.01); *H04W 76/046* (2013.01); *H04J 11/0069* (2013.01); *H04L 69/324* (2013.01); *H04W 84/12* (2013.01)

(58) Field of Classification Search
CPC ... H04W 84/12; H04W 88/06; H04W 76/025; H04W 88/08
See application file for complete search history.

(56) References Cited

U.S. PATENT DOCUMENTS

| 2013/0088983 A1 | 4/2013 | Pragada et al. ............... 370/252 |
| 2013/0294431 A1* | 11/2013 | Wang .................... H04W 28/06 370/338 |
| 2015/0223196 A1 | 8/2015 | Kim et al. .................... 455/458 |

(Continued)

FOREIGN PATENT DOCUMENTS

| EP | 2908582 A1 | 10/2012 |
| WO | WO2013052805 A1 | 10/2011 |

OTHER PUBLICATIONS

International Search Report and Written Opinion of International Search Authority for PCT/CN2017/084323 dated Aug. 7, 2017 (11 pages).

*Primary Examiner* — Nam Huynh
(74) *Attorney, Agent, or Firm* — Imperium Patent Works; Helen Mao (57) ABSTRACT

Apparatus and methods are provided for LWA uplink routing. In one novel aspect, signaling of an address from the eNB to the UE to enable the UE to populate Address-3 of the MAC header to enable layer-2 forwarding of uplink LWA PDUs from the WLAN AP to an appropriate network entity that implements part or the whole WT functionalities. In one embodiment, the network entity is a WT node, or the eNB or a node aggregating multiple connections to a WT node. In one embodiment, the RRC signaling is used to send the WT node MAC address where the RRC signaling message is a PDCP-Config message or a WLAN-MobilityConfig message. In one embodiment, multiple WT nodes are connected with the WLAN AP. The eNB selects one WT node or the UE selects one WT node to populate the address-3 of the MAC header.

24 Claims, 6 Drawing Sheets

(51) Int. Cl.
   *H04W 84/12* (2009.01)
   *H04J 11/00* (2006.01)

(56) References Cited

U.S. PATENT DOCUMENTS

2015/0351079 A1   12/2015   Himayat et al. .............. 370/329
2017/0257265 A1*  9/2017   Hong .................. H04L 41/0803

* cited by examiner

| TO DS | FRM DS | ADDR-1 | ADDR-2 | ADDR-3 | | ADDR-4 | |
|---|---|---|---|---|---|---|---|
| | | | | MSDU & SHORT A-MSDU | BASIC A-MSDU | MSDU & SHORT A-MSDU | BASIC A-MSDU |
| 0 | 0 | RA=DA | TA=SA | BSSID | BSSID | N/A | N/A |
| 0 | 1 | RA=DA | TA=BSSID | SA | BSSID | N/A | N/A |
| 1 | 0 | RA=BSSID | TA=SA | DA | BSSID | N/A | N/A |
| 1 | 1 | RA | TA | DA | BSSID | N/A | BSSID |

UPLINK ROUTING FOR ENHANCED LWA

CROSS REFERENCE TO RELATED APPLICATIONS

This application claims priority under 35 U.S.C. § 119 from U.S. Provisional Application No. 62/335,853 entitled "UPLINK ROUTING FOR ENHANCED LWA" filed on May 13, 2016, the subject matter of which is incorporated herein by reference.

TECHNICAL FIELD

The disclosed embodiments relate generally to wireless communication, and, more particularly, to uplink routing for enhanced LTE-WLAN aggregation (LWA).

BACKGROUND

Mobile data usage has been increasing at an exponential rate in recent year. A Long-Term Evolution (LTE) system offers high peak data rates, low latency, improved system capacity, and low operating cost resulting from simplified network architecture. In LTE systems, an evolved universal terrestrial radio access network (E-UTRAN) includes a plurality of base stations, such as evolved Node-B's (eNBs) communicating with a plurality of mobile stations referred as user equipment (UEs). However, the continuously rising demand for data traffic requires additional solutions. Internetworking between the LTE network and the unlicensed spectrum WLAN provides additional bandwidth to the operators. The LTE-WLAN aggregation (LWA) provides data aggregation at the radio access network where an eNB schedules packets to be served on LTE and WiFi radio link. The advantage of this solution is that it can provide better control and utilization of resources on both links. This can increase the aggregate throughput for all users and improve the total system capacity by better managing the radio resources among users. However, issues remain as to how to implement LWA efficiently. In LWA, one possible method is to let uplink WLAN frames carrying LWA PDUs using the EtherType value of 0x9E65 that was assigned by the IEEE Registration Authority Committee (IEEE RAC) for downlink LWA packets. Such method, however, requires upgrades/changes to the WLAN access points (APs). Given the massive deployment of the WLAN APs, this method creates large overhead for the LWA roll out. Further, in some LWA deployments, a WLAN AP may be connected to multiple WLAN terminations (WTs). Many WLAN APs may have multiple SSIDs and may belong to multiple mobility sets. Since the LWA PDUs themselves do not contain any routing information, some additional mechanism is required to achieve correct forwarding.

Improvements and enhancements are required for LWA PDU uplink routing.

SUMMARY

Apparatus and methods are provided for LWA uplink routing. In one novel aspect, signaling of an address from the eNB to the UE to enable the UE to populate Address-3 of the IEEE 802.11 MAC header to enable layer-2 forwarding of uplink LWA PDUs from the WLAN AP to an appropriate network entity transparently. In one embodiment, the UE establishes a connection with a first radio access network (RAN) via a first radio link in a wireless network, wherein the UE is associated with a second RAN for LTE-WLAN aggregation (LWA) via a second radio link. The UE also obtains an address of a network entity for uplink LWA through a signaling message from the first RAN, wherein the network entity implements a part or whole of a WLAN terminal (WT) function. The UE subsequently transmits LWA protocol data units (PDUs) to the network entity using the second radio link, wherein the address of the network entity is populated in an Address-3 of a MAC header of the second radio link, and wherein the LWA PDUs is routed to the network entity by the second RAN transparently.

In one embodiment, the appropriate network entity implements part or the whole WT functionalities. In another embodiment, the network entity address is a physical address or a logical address. In one embodiment, the address of the WT node is the MAC address. In one embodiment, the network entity is a WT node. In another embodiment, the network entity is the eNB of the LTE system. In yet another embodiment, the network entity is a node aggregating multiple connections to a WT node. In one embodiment, the RRC signaling is used to send the WT node MAC address. In one embodiment, the RRC signaling message is a PDCP-Config message. In another embodiment, the RRC signaling message is a WLAN-MobilityConfig message. In one embodiment, multiple WT nodes are connected with the WLAN AP and the eNB selects one WT node and signals the WT node to the UE. In another embodiment, the eNB sends one or more WT nodes to the UE. The UE selects one WT node and populates the address-3 of the MAC header with the selected WT node.

Other embodiments and advantages are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

DETAILED DESCRIPTION

Reference will now be made in detail to some embodiments of the invention, examples of which are illustrated in the accompanying drawings.

LWA is a tight integration at radio level, which allows for real-time channel and load aware radio resource management across WLAN and LTE to provide significant capacity and QoE improvements. When enabling LWA, S1-U is terminated at eNB whereby all IP packets are routing to eNB and perform PDCP aspects (i.e., ROHC, ciphering) as an LTE PDU. Afterwards, eNB can schedule whether LWA-LTE link or LWA-Wi-Fi link the LTE PDU shall go. It is understood by one of ordinary skills in the art that the principle of the methods may apply other data aggregation scenarios. Though LTE and WLAN are being used in the description, the disclosed method applies to other RAN as well.

Figure 1:
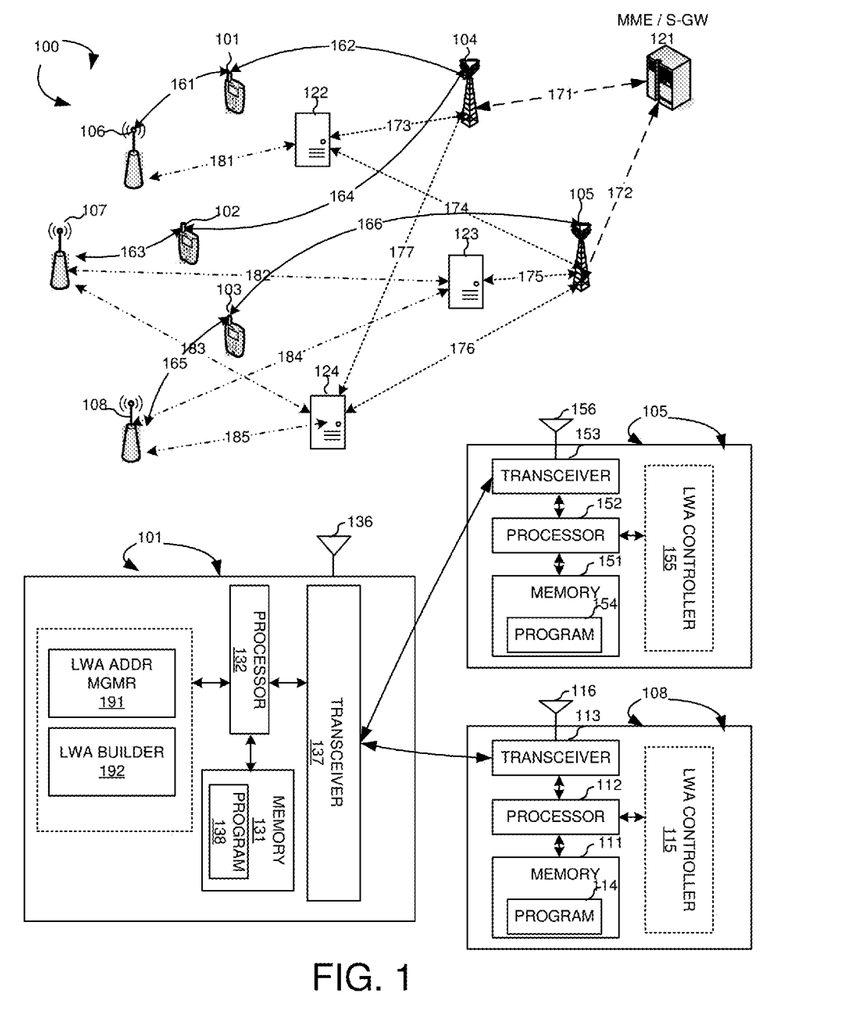
FIG. 1 illustrates a system diagram of a wireless network with LWA in accordance with embodiments of the current invention.

FIG. 1 illustrates a system diagram of a wireless network 100 with the LWA in accordance with embodiments of the current invention. Wireless communication system 100 includes one or more mobility management entity (MME)/serving gateway (S-GW) MME/S-GW 122, one or more fixed base infrastructure units, such as base stations 104, 105, 106, 107, and 108, forming a network distributed over a geographical region. The base unit may also be referred to as an access point, an access terminal, a base station, a Node-B, an eNode-B (eNB), or by other terminology used in the art. The one or more base stations 104, 105, 106, 107, and 108 serve a number of mobile stations 101, 102, and 103 within a serving area, for example, a cell, or within a cell sector. Base stations 104, 105, 106, 107, and 108 can support different radio access technologies (RATs). In a particular example, base station 104 and 105 are LTE eNBs and 106, 107 and 108 are WLAN access points (APs).

In one novel aspect, mobile stations with LWA capabilities establish links with the first RAN while associating with the second RAN. The mobile LWA-capable mobile station sends uplink LWA data packets to the associated AP. The AP forwards the LWA data packets to a WLAN termination (WT) node transparently based on address supplied by the mobile station. The WT address can be a physical address of the WT node or a logical address of the WT node. In one embodiment, the address is the MAC address of the WT node. In another embodiment, the WT address is a logical address where the WT node has multiple MAC addresses. In one embodiment, the first RAN is an LTE system, and the second RAN is a WLAN network. As shown in FIG. 1, LWA-capable mobile station 101 is connected with eNB 104 via radio link 162 and is associated with AP 106 via radio link 161. LWA-capable mobile station 102 is connected with eNB 104 via radio link 164 and is associated with AP 107 via radio link 163. LWA-capable mobile station 103 is connected with eNB 105 via radio link 166 and is associated with AP 108 via radio link 165. eNB 104 and eNB 105 connect to MME/S-GW 121 via S1 links 171 and 172, respectively.

In one novel aspect, the mobile station/UE obtains the WT address through signaling messages with eNB. The LWA architecture model introduces the concept of a logical node called WT, which serves as the interface between the LTE and WLAN networks. As shown in FIG. 1, WT 122, 123, and 124 are logical nodes, which implement the WT functionality. WLAN deployments are quite diverse and WLAN APs can come in different sizes and shapes, ranging from full-fledged standalone APs that provide the full slate of network plane services to lightweight APs that essentially serve as remote radio heads. WLAN APs may be connected to one or more nodes implementing the WT functionality over layer 2 or layer 3, and may use standardized protocols like Control And Provisioning of Wireless Access Points (CAPWAP) or proprietary protocols. In one embodiment, the AP is connected with one WT node. In another embodiment, the AP may connect to multiple WT nodes. WT 122 connects to one AP 106 via link 181 and connects to two eNBs 104 and 105 via links 173 and 174, respectively. WT 123 connects to two APs 107 and 108 via links 182 and 184, respectively, and connects to one eNB 105 via link 175. WT 124 connects to two APs 107 and 108 via links 183 and 185, respectively, and connects to two eNBs 104 and 105 via links 177 and 176, respectively. In one embodiment, the WT resides in the eNB. In such case, the WT address is the eNB address. In other embodiments, WT is a separate node with a distinct address. In yet another embodiment, the WT is a node aggregating multiple connections to a WT node.

FIG. 1 further shows simplified block diagrams of eNB 105, WLAN AP 102, and mobile station 103 in accordance with the current invention. eNB 105 has an antenna 156, which transmits and receives radio signals. A RF transceiver module 153, coupled with the antenna, receives RF signals from antenna 156, converts them to baseband signals and sends them to processor 152. RF transceiver 153 also converts received baseband signals from processor 152, converts them to RF signals, and sends out to antenna 156. Processor 152 processes the received baseband signals and invokes different functional modules to perform features in eNB 105. Memory 151 stores program instructions and data 154 to control the operations of eNB 105. eNB 105 also includes a set of control modules such LWA controller 151 that carry out functional tasks to support LWA features and to communicate with mobile stations.

Similarly, WLAN AP 108 has an antenna 116, which transmits and receives radio signals. A RF transceiver module 113, coupled with the antenna, receives RF signals from antenna 116, converts them to baseband signal, and sends them to processor 112. RF transceiver 113 also converts received baseband signals from processor 112, converts them to RF signals, and sends out to antenna 116. Processor 122 processes the received baseband signals and invokes different functional modules to perform features in WLAN AP 108. Memory 111 stores program instructions and data 114 to control the operations of WLAN AP 108. WLAN AP 108 also includes a set of control modules, such as LWA controller 115 that carries out functional tasks to support the LWA features and to communicate with mobile stations.

Mobile station 101 has an antenna 136, which transmits and receives radio signals. A RF transceiver module 137, coupled with the antenna, receives RF signals from antenna 136, converts them to baseband signals and sends them to processor 132. RF transceiver 137 also converts received baseband signals from processor 132, converts them to RF signals, and sends out to antenna 136. Processor 132 processes the received baseband signals and invokes different functional modules to perform features in mobile station 101. Memory 131 stores program instructions and data 138 to control the operations of mobile station 103. Transceiver 137 of mobile station 101 includes two transceivers 133 and 135. Transceiver 137 transmits and receives transmissions to/from transceiver 153 of eNB 105 and 113 of WLAN 108.

Mobile station 101 also includes a set of control modules that carry out functional tasks. A LWA address manager 191 obtains an address of a network entity for uplink LWA through a signaling message from the first RAN, wherein the network entity implements a part or whole of a WLAN terminal (WT) function. A LWA PDU builder 192 transmits LWA protocol data units (PDUs) to the network entity using the second radio link, wherein the address of the network entity is populated in an Address-3 of a MAC header of the second radio link, and wherein the LWA PDUs is routed to the network entity by the second RAN transparently.

Figure 2:
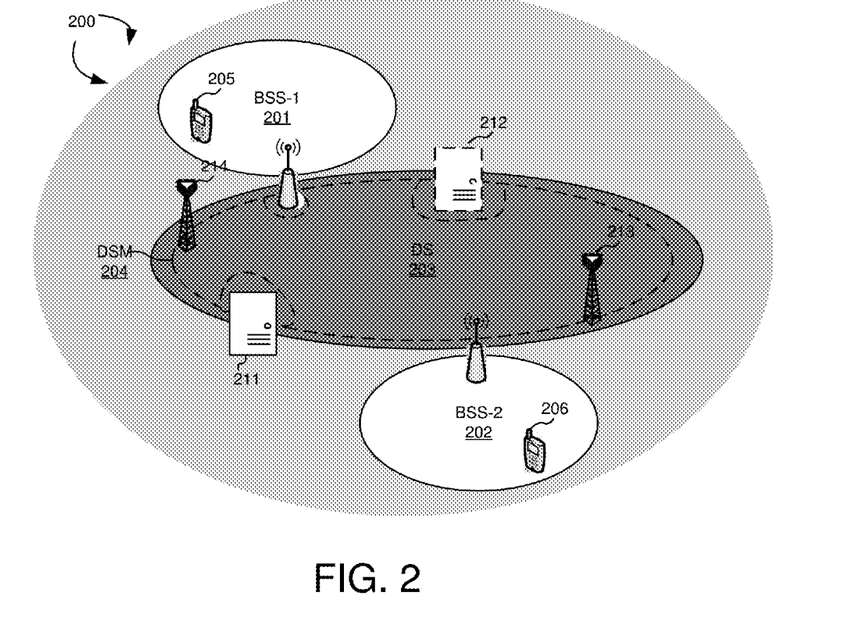
FIG. 2 illustrates an exemplary diagram of a LWA system 200 with WLAN APs and WT nodes being part of the same layer-2 network for LWA PDU uplink routing in accordance with embodiments of the current invention.

FIG. 2 illustrates an exemplary diagram of a LWA system 200 with WLAN APs and WT nodes being part of the same layer-2 network for LWA PDU uplink routing in accordance with embodiments of the current invention. As part of the LWA/WIFI architecture, an extended service set (ESS) is formed with distribution system (DS) and WLAN APs/basic service set (BSS) stitched together to create arbitrary large WLANs. In one novel aspect, the one or more WT nodes are also part the ESS. When the WLAN APs and WT node(s) are part of an ESS, a natural approach for forwarding LWA PDUs would be to use existing layer-2 forwarding mechanisms already supported by the WIFI specification Error! Reference source not found. As shown in FIG. 2, LWA system 200 includes mobile stations 205 and 206, LTE eNBs 213 and 214, WLAN APs each forming a BSS including BSS-1 201 and BSS-2 202. Mobile stations/UEs 205 and 206 each connects with the LTE system via eNBs 214 and 213, respectively. Mobile stations 205 and 206 are associated with WLAN APs 201 and 202, respectively. In one novel aspect, mobile stations transmit uplink LWA PDUs through WiFi links to the WLAN APs. WLAN APs forward the LWA PDUs to the WT node transparently. As shown, instead of existing independently, an infrastructure BSS may also form a component of an extended form of network that is built with multiple BSSs. The architectural component used to interconnect BSSs is the distribution system (DS). DS 203 is built with BSS-1 201 and BSS-2 202. In one novel aspect, the LWA system 200 also includes WT nodes 211 and 212. LTE eNB 213 and LTE eNB 214 is part of the ESS. In another embodiment, the LTE eNBs are not part of the ESS. WT nodes forward the LWA data packets to the LTE eNBs. The ESS logically separates WLAN management (WM) from the distribution medium (DSM). DSM 204 is formed to logically connect BSS-1 201, BSS-2 202, WT 211, and WT 212 together. In one embodiment, one or more eNBs of the LTE system has the WT functionalities integrated. In such cases, the eNB with WT functions may be part of the DSM 203. Each logical medium is used for different purposes. The multiple media, such as the WLAN data packets and the LTE data packets are logically connected. DS 203 enables mobile stations support by providing the logic service necessary to handle address to destination mapping and seamless integration of multiple BSSs and WT nodes.

Figure 3:
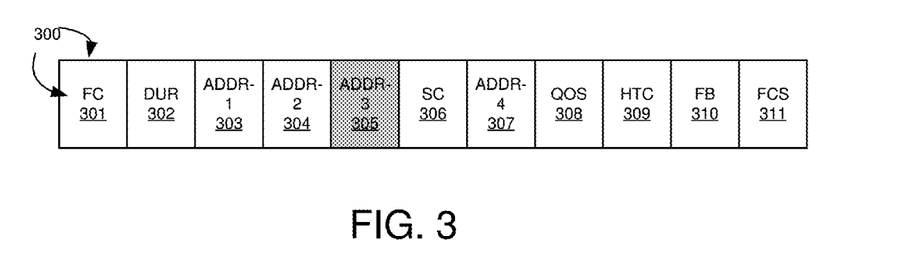
FIG. 3 illustrates an exemplary block diagram of the MAC header with address-3 populated with the address of the WT nodes in accordance with embodiments of the current invention.

FIG. 3 illustrates an exemplary block diagram of the MAC header with address-3 populated with the address of the WT nodes in accordance with embodiments of the current invention. MAC header 300 includes a forward control field 301, a duration filed 302, an address-1 303, an address-2 304, and address-3 305, a sequence control field 306, an address-4 307, a QoS control field 308, a HT control field 309, a frame body (FB) field 310, and a FCS field 311. In one embodiment, address-3 305 is populated with WT node address. The MAC header can contain as many as four 48-bit addresses. Address-1 303 contains the MAC address of the intended recipient, also referred to as "Receiver Address." Address-2 304 contains the MAC address of the transmitter, also referred to as "Transmitter Address." The content of Address-3 depends on the setting of "ToDS" and "FromDS" bits of the 16-bit frame control field in the MAC address. DS refers to "Distribution Service" which is the Layer-2 forwarding function. It is typically located in the WLAN AP. When either the ToDS or FromDS bit is set to "1", there are three addresses, namely, immediate destination (RA), immediate source (TA), Final L2 destination (DA) or original L2 source (SA). Address-4 306 is used when both the "ToDS" and "FromDS" bits of the frame control field are set to "1". It is used by MAC entities that are used for relaying frames. These nodes are neither the final L2 destination (SA) nor original L2 source (SA). In one embodiment, the address-3 305 is populated with the WT node MAC address such that the AP would transparently forwarded it to the WT node.

Figure 4:
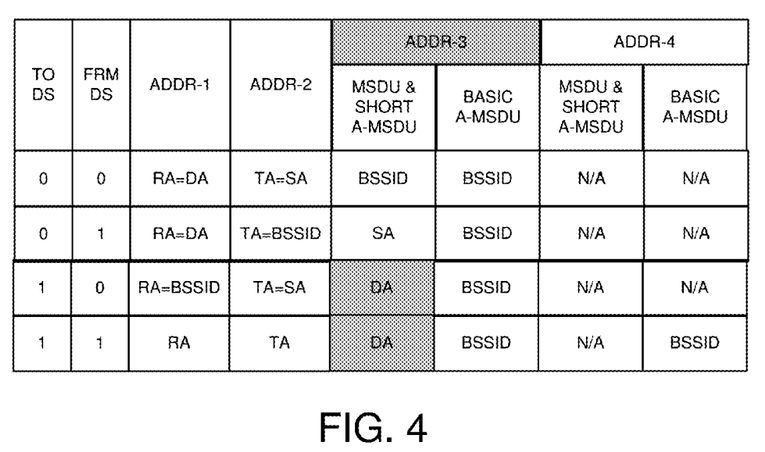
FIG. 4 illustrates an exemplary table of how address-3 is populated based on the indicative bits in accordance with embodiments of the current invention.

FIG. 4 illustrates an exemplary table of how address-3 is populated based on the indicative bits in accordance with embodiments of the current invention. In one embodiment, the UE obtains the MT node MAC address from the eNB in the LTE system and populates the address-3 of the MAC header to send the LWA PDUs to the WLAN AP. As shown, when the "ToDS" bit is set to be "1", address-3 of the MAC header contains the Final L2 destination address DA. The WLAN AP would forward the data packets to the MT node transparently based on the MAC address in the address-3 field of the MAC header.

Figure 5:
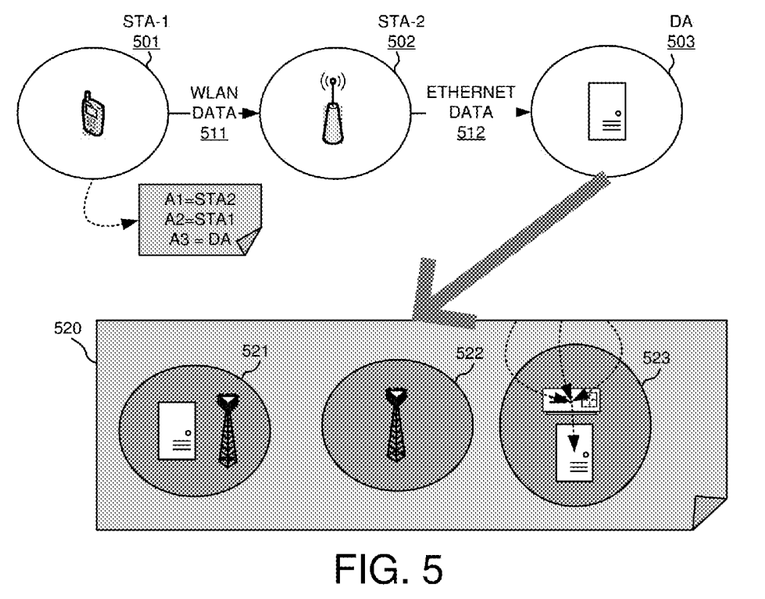
FIG. 5 illustrates an exemplary diagram of layer-2 forwarding in the context of LWA in accordance with embodiments of the current invention.

FIG. 5 illustrates an exemplary diagram of layer-2 forwarding in the context of LWA in accordance with embodiments of the current invention. The UE uses the MAC address of the WT to populate Address-3 in the WLAN MAC header of frames carrying LWA PDUs, allowing the WLAN AP to transparently forward the received LWA PDUs to the WT. In one embodiment, the WLAN AP and WT are connected over Ethernet, and A-MSDUs are not used. Station (STA)-1 501 is associated with STA-2 502 via WLAN link and connects to a LTE eNB. A WT node with a DA 503 is connected with both the STA-2 502 and the LTE eNB. At step 511, STA-1 501 sends WLAN data to STA-2 502 via WLAN link. In one embodiment, the address-1 of the MAC header of message 511 is the MAC of STA-2 indicating the destination address. The address-2 of the MAC header of message 511 is the MAC address of STA-1 indicating the source address of the message. The address-3 of the MAC header of message 511 is the MAC address of the WT node 503 indicating the Final L2 destination address. STA-2 502 upon receiving the WLAN data 511 forwards the data packets to the WT node in the Ethernet packet 512 based on the MAC address of the address-3.

The WT node can be different entities for different network configuration. WT node configuration 520 illustrates different WT node configurations. In one configuration, 521, the eNB is connected with the WT node. The DA MAC address populated in the address-3 of the WLAN MAC header is the MAC of the WT node. In one embodiment, the WLAN AP is connected with one WT node. In another embodiment, the AP is connected to multiple WT nodes. The mobile station receives the WT node MAC address from the eNB signaling message. The UE populates the address-3 of the MAC header for the WLAN data with the received WT node MAC header. In another embodiment, shown in 522, the WLAN AP is connected to the eNB over Layer-2. The WT functionality is integrated in the eNB. In such scenario, the DA MAC address populated in the address-3 of the WLAN MAC header is the MAC of the eNB. In yet another embodiment, shown in 523, the WLAN AP is connected to a node that aggregates connections to the WT. In such scenario, the DA MAC address populated in the address-3 of the WLAN MAC header is the MAC of the aggregating node.

In one novel aspect, the eNB provides the MAC address to use over RRC signaling in order to permit the UE to populate address 3 with the appropriate address.

Figure 6:
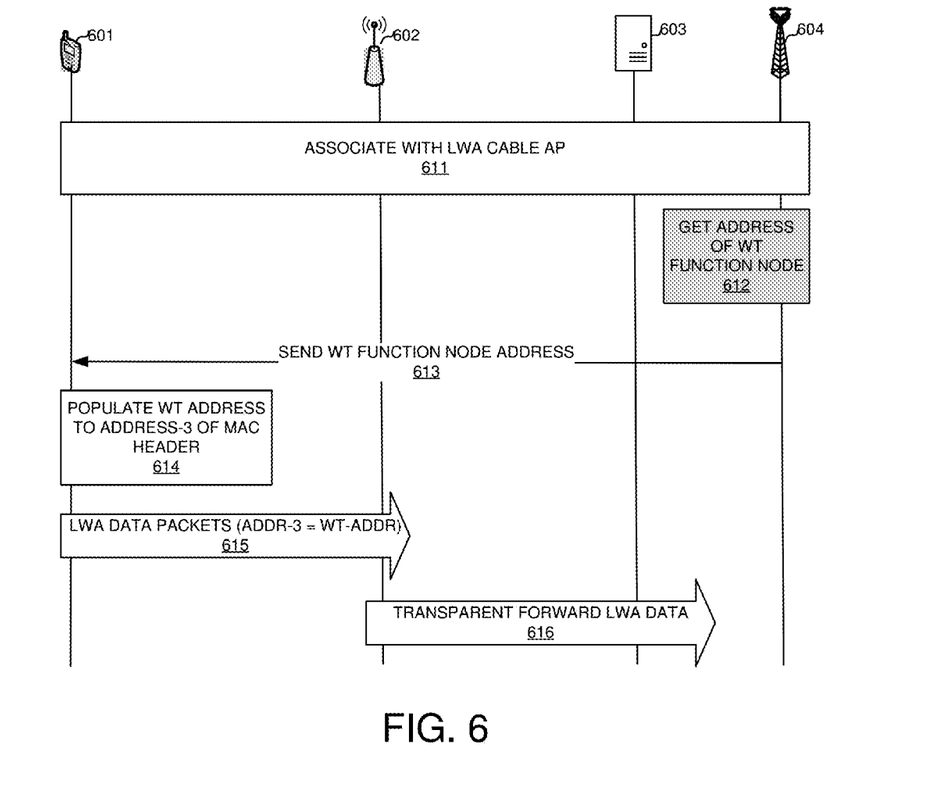
FIG. 6 illustrates an exemplary flow diagram of the eNB signals the MAC address of a network entity with part or the whole of WT functionality to the UE for uplink LWA in accordance with embodiments of the current invention.

FIG. 6 illustrates an exemplary flow diagram of the eNB signals the MAC address of a network entity with part or the whole of WT functionality to the UE for uplink LWA in accordance with embodiments of the current invention. In one embodiment, after LWA association, the eNB signals the UE with a network entity MAC address that implements part or the whole of the WT functionality. In one embodiment, the LWA address information may be kept at the database by the eNB. The UE, upon receiving it, can store it in its database. The addressing information may be pre-acquired between eNB and the network entity that implements part or the whole of the WT functionality. In other embodiment, there are multiple LWA accesses, with respect to WLAN APs/Wi-Fi modems. The LTE modem can report multiple MAC addresses for individual LWA-WiFi link. In yet another embodiment, UEs, such as smartphones, equipped with multiple LTE modems can camp on different eNBs respectively. The respective eNB can negotiate its MAC address for corresponding LWA. In yet another embodiment, when the WLAN AP is connected to multiple WTs, the UE can use the address-3 field in the MAC header of frames carrying uplink LWA PDUs to identify the WT to which the LWA PDU needs to be sent.

A UE 601 is connect with an eNB 604 and selects a WLAN AP 602 for LWA. In one embodiment, a WT node 603 connects with WLAN AP 602 and implements WT functionalities. At step 611, UE 601 establishes association with LWA enabled AP 602. At step 612, eNB 604, get the address of the WT node 603. In one embodiment, the address of the WT node is the MAC address of eNB itself, when the WT functions are integrated within the eNB. In another embodiment, the AP maybe connected with multiple WT nodes and one or more WT nodes MAC addresses are obtained by the eNB. In yet another embodiment, the WT node is an aggregating node of multiple WT nodes. At step 613, eNB 604 signals UE 601 of the MAC address of the network entity implementing the WT functionalities. In one embodiment, eNB 604 provides the MAC address over the RRC signaling. In one embodiment, the MAC address is contained in the PDCP-Config message. In another embodiment, the MAC address is contained in the WLAN-MobilityConfig message. The physical or logical address of the network entity implementing part or whole of the WT function is contained in either the PDCP-Config message or the WLAN-MobilityConfig message. The physical or logical address of the WT node is coded as one IE in the corresponding selected RRC message. In one embodiment, when there are multiple WT nodes connecting to the WLAN APs, eNB 604 selects a subset of the WT nodes to send to UE 601. In one embodiment, all WT nodes connecting to the WLAN AP is sent to the UE. The UE upon receiving multiple WT nodes makes selection to the WT node it intends the LWA PDUs to destine to and populates the address-3 with the MAC address of the selected WT nodes. In another embodiment, when there are multiple WT nodes connecting to the WLAN APs, eNB 604 selects one WT node and sends the MAC address of the selected WT node to UE 601. At step 614, UE 601 in preparing the LWA uplink data packets, populates the MAC address of the WT node to the address-3 of the MAC header. In one embodiment, there is only one WT node signaled by the eNB. UE 601 stores the WT node. In another embodiment, UE 601 populates address-3 of the MAC header with the stored WT node MAC address. In yet another embodiment, UE 601 receives multiple WT nodes from eNB 604. When populating the address-3, UE 601 selects one WT node MAC address based on one or more predefined or preconfigured rules. At step 616, UE 601 sends WLAN data packets with LWA PDUs with address-3 of the MAC header populated with the WT node address. At step 616, WLAN AP 602 forwards the LWA data packets to the WT node transparently based on the address-3 of the received MAC header.

Figure 7:
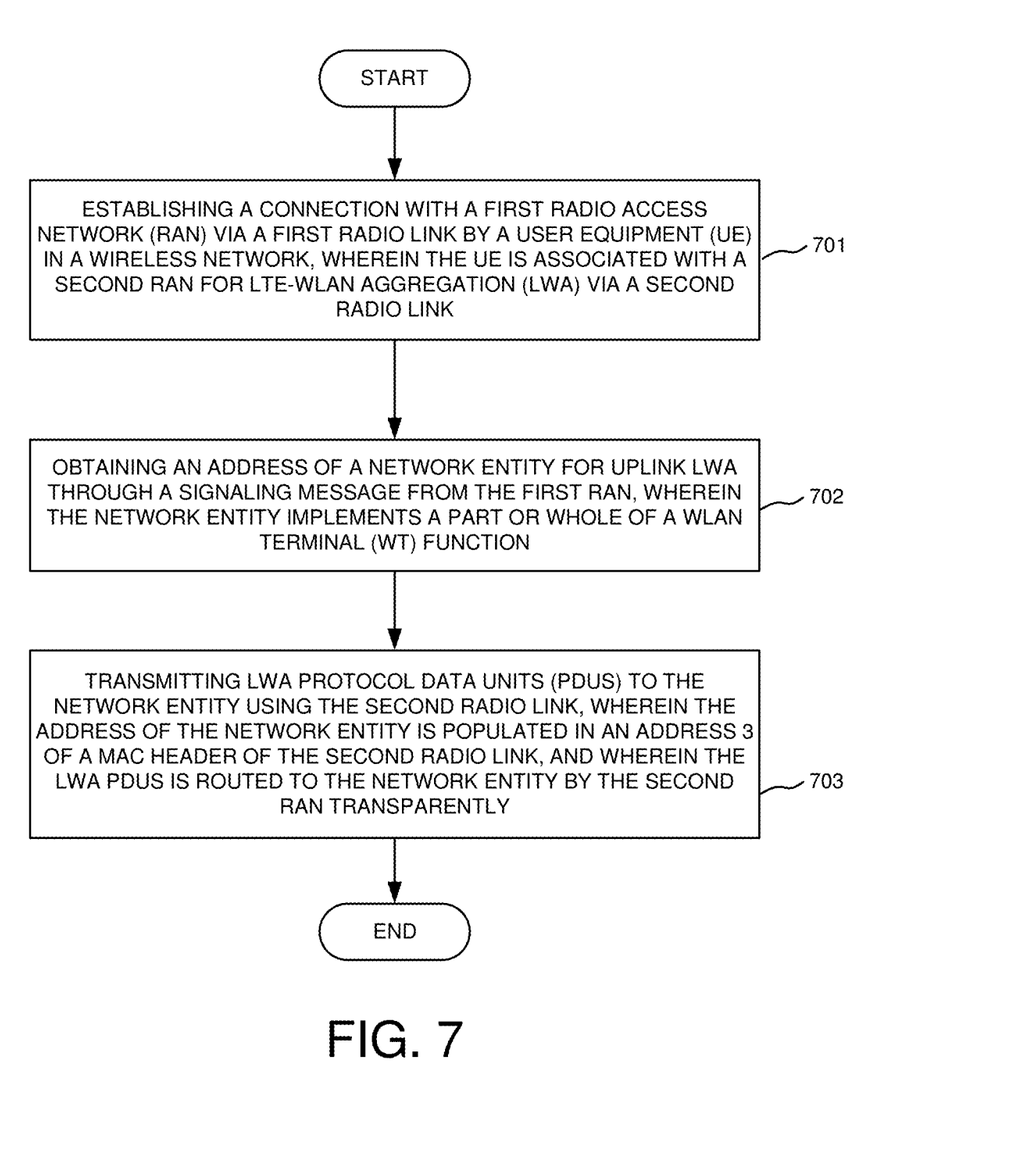
FIG. 7 illustrates an exemplary flow chart of the UE implementing uplink routing for enhanced LWA in accordance with embodiments of the current invention.

FIG. 7 illustrates an exemplary flow chart of the UE implementing uplink routing for enhanced LWA in accordance with embodiments of the current invention. At step 701, the UE establishes a connection with a first radio access network (RAN) via a first radio link in a wireless network, wherein the UE is associated with a second RAN for LTE-WLAN aggregation (LWA) via a second radio link. At step 702, the UE obtains an address of a network entity for uplink LWA through a signaling message from the first RAN, wherein the network entity implements a part or whole of a WLAN terminal (WT) function. At step 703, the UE transmits LWA protocol data units (PDUs) to the network entity using the second radio link, wherein the address of the network entity is populated in an Address-3 of a MAC header of the second radio link, and wherein the LWA PDUs is routed to the network entity by the second RAN transparently.

Figure 8:
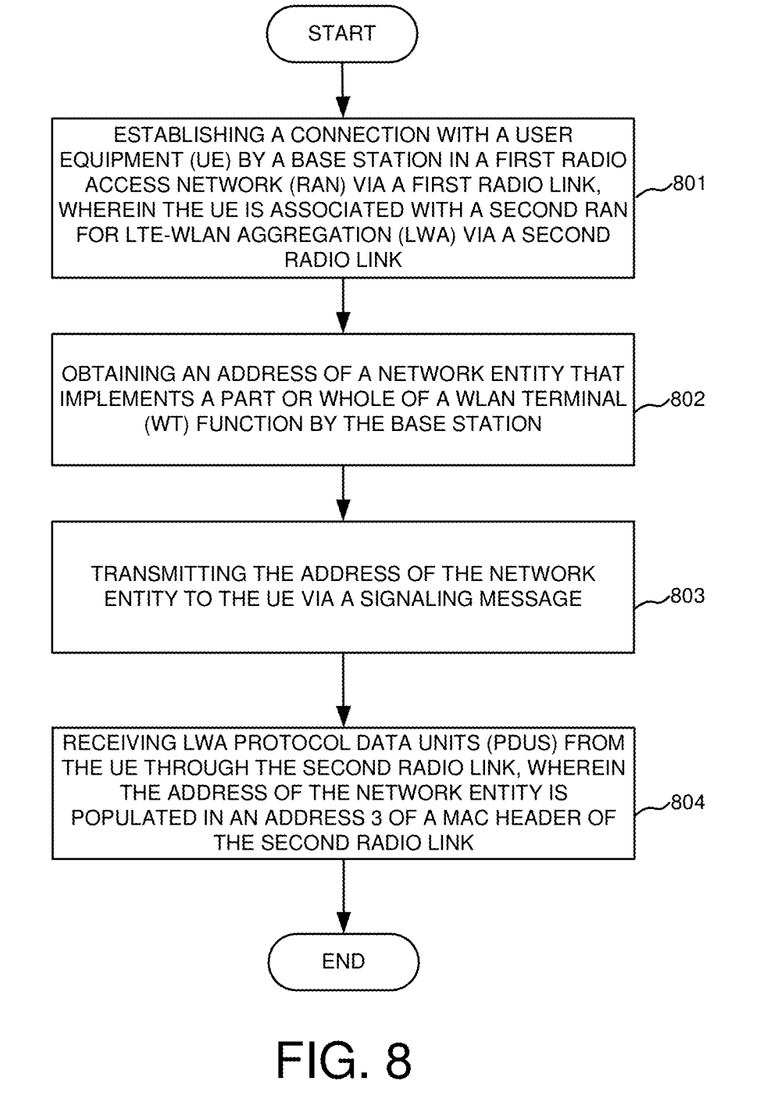
FIG. 8 illustrates an exemplary flow chart of the eNB implementing uplink routing for enhanced LWA in accordance with embodiments of the current invention.

FIG. 8 illustrates an exemplary flow chart of the eNB implementing uplink routing for enhanced LWA in accordance with embodiments of the current invention. At step 801, the base station establishes a connection with a user equipment (UE) in a first radio access network (RAN) via a first radio link, wherein the UE is associated with a second RAN for LTE-WLAN aggregation (LWA) via a second radio link. At step 802, the base station obtains an address of a network entity that implements a part or whole of a WLAN terminal (WT) function by the base station. At step 803, the base station transmits the address of the network entity to the UE via a signaling message. At step 804, the base station receives LWA protocol data units (PDUs) from the UE through the second radio link, wherein the address of the network entity is populated in an Address 3 of a MAC header of the second radio link.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A method comprising:
   establishing a connection with a first radio access network (RAN) via a first radio link by a user equipment (UE) in a wireless network, wherein the UE is associated with a second RAN for LTE-WLAN aggregation (LWA) via a second radio link;
   obtaining an address of a network entity for uplink LWA through a signaling message from the first RAN, wherein the network entity implements a part or whole of a WLAN termination (WT) function; and
   transmitting LWA protocol data units (PDUs) to the network entity using the second radio link, wherein the address of the network entity is populated in an Address 3 of a MAC header of the second radio link, and wherein the LWA PDUs are routed to the network entity by a WLAN access point (AP) of the second RAN transparently.

2. The method of claim 1, wherein the address of the network entity is a MAC address of the network entity.

3. The method of claim 1, wherein the network entity is a WT node.

4. The method of claim 1, wherein the network entity is an enhanced nodeB (eNB) of the first RAN.

5. The method of claim 1, wherein the network entity is a node aggregating multiple connections to a WT node.

6. The method of claim 1, wherein the signaling message is a radio resource control (RRC) signaling message.

7. The method of claim 6, wherein the RRC signaling message is a PDCP-Config message.

8. The method of claim 6, wherein the RRC signaling message is a WLAN-MobilityConfig message.

9. A method comprising:
   establishing a connection with a user equipment (UE) by a base station in a first radio access network (RAN) via a first radio link, wherein the UE is associated with a second RAN for LTE-WLAN aggregation (LWA) via a second radio link;
   obtaining an address of a network entity that implements a part or whole of a WLAN termination (WT) function by the base station;
   transmitting the address of the network entity to the UE via a signaling message; and
   receiving LWA protocol data units (PDUs) from the UE through a WLAN access point (AP) of the second radio link, wherein the address of the network entity is populated in an Address 3 of a MAC header of the second radio link.

10. The method of claim 9, wherein the address of the network entity is a MAC address of the network entity.

11. The method of claim 9, wherein the network entity is a WT node.

12. The method of claim 9, wherein the network entity is an enhanced nodeB (eNB) of the first RAN.

13. The method of claim 9, wherein the network entity is a node aggregating multiple connections to a WT node.

14. The method of claim 9, wherein the signaling message is a radio resource control (RRC) signaling message.

15. The method of claim 14, wherein the RRC signaling message is a PDCP-Config message.

16. The method of claim 14, wherein the RRC signaling message is a WLAN-MobilityConfig message.

17. An user equipment (UE) connecting with a first RAN in a wireless communication network, comprising: a radio frequency (RF) transceiver that transmits and receives radio signals in the wireless communication network with the first RAN and a second RAN for LTE-WLAN aggregation (LWA);
   an LWA address manager that obtains an address of a network entity for uplink LWA through a signaling message from the first RAN, wherein the network entity implements a part or whole of a WLAN termination (WT) function; and
   a LWA PDU builder that transmits LWA protocol data units (PDUs) to the network entity using the second radio link, wherein the address of the network entity is populated in an Address 3 of a MAC header of the second radio link, and wherein the LWA PDUs are routed to the network entity by a WLAN access point (AP) of the second RAN transparently.

18. The UE of claim 17, wherein the address of the network entity is a MAC address of the network entity.

19. The UE of claim 17, wherein the network entity is a WT node.

20. The UE of claim 17, wherein the network entity is an enhanced nodeB (eNB) of the first RAN.

21. The UE of claim 17, wherein the network entity is a node aggregating multiple connections to a WT node.

22. The UE of claim 17, wherein the signaling message is a radio resource control (RRC) signaling message.

23. The UE of claim 22, wherein the RRC signaling message is a PDCP-Config message.

24. The UE of claim 22, wherein the RRC signaling message is a WLAN-MobilityConfig message.

* * * * *